F. N. NEWTON.
WATER WHEEL.
APPLICATION FILED MAY 16, 1916.
1,258,038.
Patented Mar. 5, 1918.
2 SHEETS—SHEET 1.
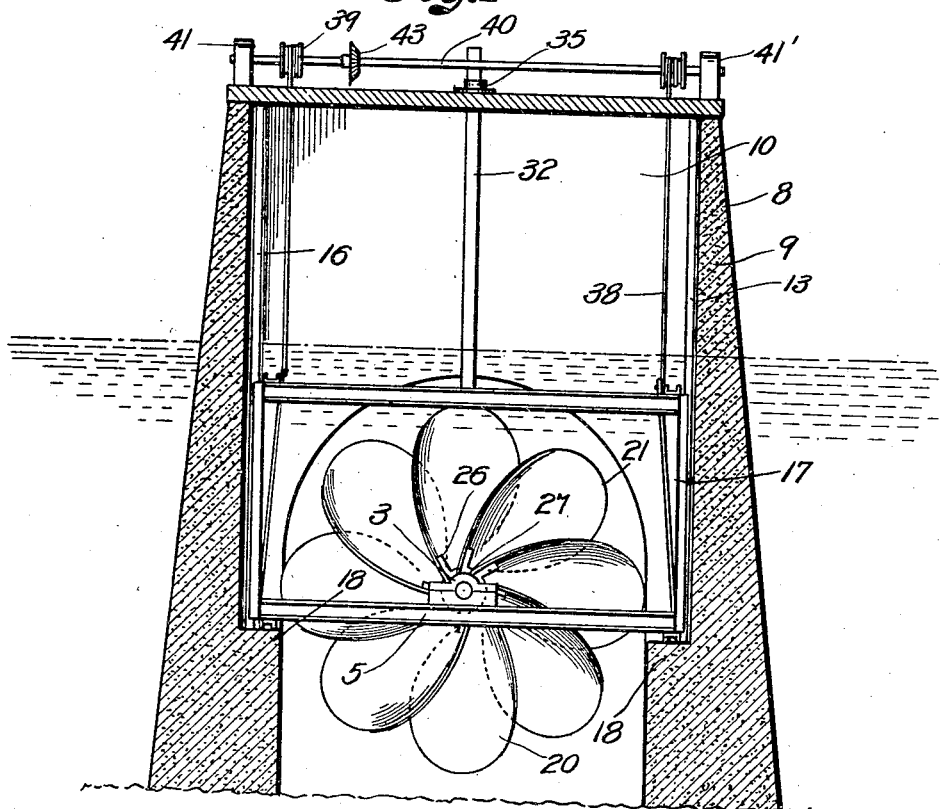
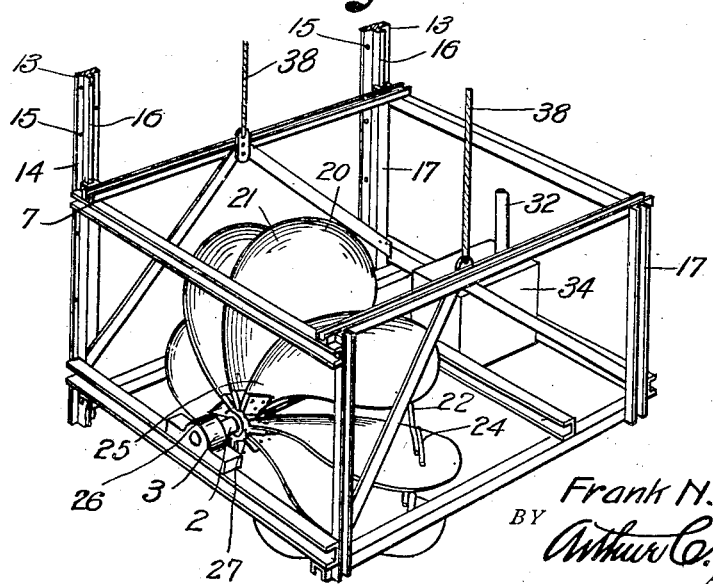
INVENTOR.
Frank N. Newton.
BY Arthur C. Brown
ATTORNEY F. N. NEWTON.
WATER WHEEL.
APPLICATION FILED MAY 16, 1916.
1,258,038.
Patented Mar. 5, 1918.
2 SHEETS—SHEET 2.
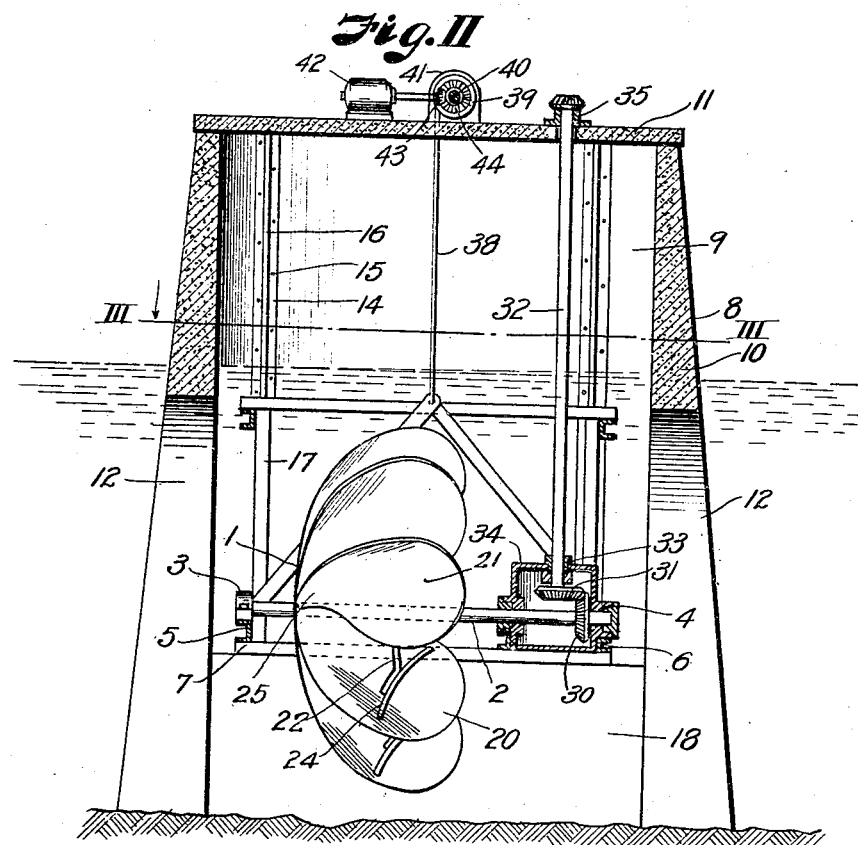
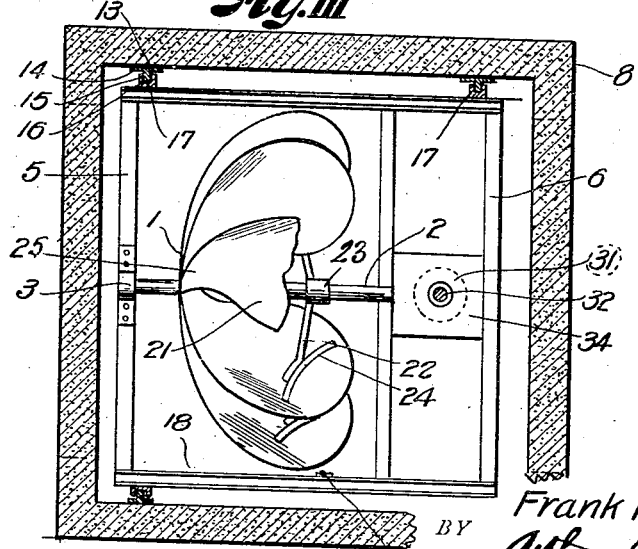
INVENTOR.
Frank N. Newton.
BY
Arthur C. Brown
ATTORNEY

UNITED STATES PATENT OFFICE.

FRANK N. NEWTON, OF KANSAS CITY, MISSOURI.

WATER-WHEEL.

1,258,038.　　　　　Specification of Letters Patent.　　　Patented Mar. 5, 1918.

Application filed May 16, 1916.　Serial No. 97,787.

*To all whom it may concern:*

Be it known that I, FRANK N. NEWTON, a citizen of the United States, residing at Kansas City, in the county of Jackson and State of Missouri, have invented certain new and useful Improvements in Water-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to water wheels and more particularly to a type of wheel that may be anchored in a stream and turned by the force of the current to operate a driving shaft, the principal object of the invention being to provide a wheel of this character wherein the blades are so shaped and positioned that the greatest amount of efficiency may be derived from a flowing body of water.

In accomplishing this object, I have provided the details of structure, hereinafter described and illustrated in the accompanying drawings, wherein:—

Figure I is a transverse vertical section through the wheel housing showing a front elevation of the water wheel and its supporting members.

Fig. II is a longitudinal vertical section of the same showing the inclosed transmission.

Fig. III is a horizontal sectional view taken on line III—III (Fig. II).

Fig. IV is a detail perspective view of the water wheel and its supporting cage.

Referring more in detail to the drawings:—

1 designates a water wheel constructed according to my invention comprising a central shaft 2, which is revolubly mounted in end bearings 3—4 carried by the lower cross members 5 and 6 of a cage 7, which is adapted for vertical travel within a wheel housing 8.

The preferred type of frame for supporting the wheel comprises a housing 8 constructed of concrete or other substantial material and is built in the form of a hollow pier having side and end inclosing walls 9 and 10 respectively and a top covering 11; the end walls being provided with openings 12, through which the water may flow to revolve the wheel and which are preferably entirely below the water level so that ice will not form within the housing.

Secured within the housing to the side walls 8 are oppositely placed guides 13, comprising base flange 14 for receiving bolts or anchor pins 15, by which the guides are secured to the walls and rails 16 which are adapted for coöperating with channel members 17 on the cage 7 to guide the cage and wheel vertically when they are raised or lowered and to hold the cage solidly within the housing.

Near the base of the side walls I provide inwardly projecting ledges 18 on which the cage may seat when in functional position and which will prevent any accidental lowering of the cage too far within the stream.

Extending radially from near the forward end of the shaft 2 is a plurality of closely spaced blades 20 which are so arranged that the current flowing thereagainst will give a rotary motion to the supporting shaft 2.

The blades 20 each comprise a body 21 which extends longitudinally along the central shaft 2 and which is held spaced from adjacent blades and supported rigidly against the flow of the stream by brace rods 22. The braces are fixed at their inner ends to a collar 23 on the shaft 2 and radiate therefrom in a forwardly inclined direction and are fixed at their outer ends to bars 24 which in turn are attached transversely across the back face of the blade body.

Each of the blades is so curved that its forwardly facing side presents a concave surface to the current so that its rear end will lie within the line of the forward edge of an adjacent blade and a direct passage of water between the blades is impossible, and a revoluble movement of the wheel is effected.

At their forward ends the blade bodies terminate in restricted neck portions 25 which are curved inwardly to the shaft 2 and are attached at their ends to the radial arms 26 of a collar 27 fixed on the shaft closely adjacent its forward end. The necks of the wheel blades radiate outwardly and rearwardly from the collar 27 and the flared body portions extend rearwardly along the shaft in a somewhat spiral relation thereto so that the entire surface of each blade presents itself obliquely to the current to cause the wheel to rotate.

This arrangement and construction of the blades gives the wheel a semi-spherical shape and prevents the forward edges of the blades from forming an obstruction and obviates stoppage of driftage which would prevent free flow through the wheel.

At the down stream end of the shaft 2, I provide a bevel gear 30 that meshes with a gear 31 on a vertical shaft 32 which is carried at its lower end by a bearing 33 in a housing 34 and projects slidably through a guide bearing 35 secured on the pier covering 11; the housing 34 being water tight and incloses the gears 30 and 31 to prevent rubbish or drift from clogging the gears and causing injury to the mechanism.

In order that the wheel may be lifted from the water for repairing or for other purposes I provide the lifting cables 38, the ends of which are fastened at opposite sides of the cage 7 and on drums 39 mounted on a cross shaft 40 revolubly carried by end supports 41—44', so that the cables may be wound on the drums by revolving the shaft to raise the cage from the water; the said shaft being operated by any suitable mechanism; here shown to be a small motor 42 connected therewith through the intermediacy of gears 43 and 44 on the motor and shaft respectively.

Assuming the parts to be constructed and assembled as described, the wheel is submerged in a stream, so that the drive shaft extends parallel with the current thereof and the neck ends of the blades directed upstream. With the wheel so arranged, water flowing against the curved surfaces of the blades will impart a rotary motion to the wheel, the supporting shaft 2 and drive shaft 20, so that when the driving shaft is connected with a suitable transmission (not shown) it may operate machinery with which the device may be associated.

It is apparent that by so constructing the device, the housing will effectively prevent ice, or floating material from interfering with the operation of the wheel and that the cage may be raised or lowered to regulate the amount of power derived therefrom.

It will also be seen that by so placing the blades an extended bearing surface may be given thereto and a greater amount of efficiency derived from the flowing stream.

Having thus described my invention, what I claim as new therein and desire to secure by Letters-Patent, is:—

1. In combination with a rotatable shaft, a plurality of blades each having a neck attached to the shaft and a flared body portion extended rearwardly from the neck longitudinally along the shaft and in spaced spiral relation thereto.

2. In combination with a rotatable shaft, a plurality of blades each having a neck attached to the shaft and a flared, laterally curved body portion extended rearwardly from the neck longitudinally with the shaft, along its inner edge terminating back of the outer edge of an adjacent blade.

3. In combination with a rotatable shaft, a plurality of blades comprising body portions disposed longitudinally along the shaft in spaced relation and spirally therewith, each body having an inwardly curved and restricted neck portion attached to the shaft, and brace members attached to the shaft and to the bodies of the blades back of the neck portions to support the said bodies against collapse in the direction of the shaft.

4. In combination with a rotatable shaft, a plurality or radially arranged blades, each having a forward and inward curved neck attached to the shaft and a flared body portion integral with the neck extended longitudinally along the shaft and in spiral relation thereto, the blade bodies being transversely concave and their inner edges terminating back of the outer edges of an adjacent blade for the purpose set forth.

In testimony whereof I affix my signature.

FRANK N. NEWTON.

Copies of this patent may be obtained for five cents each, by addressing the "Commissioner of Patents, Washington, D. C."